2 Sheets--Sheet 1.
MARY F. CARPENTER.
Dress-Pattern Charts.
No. 155,287.  Patented Sept. 22, 1874.
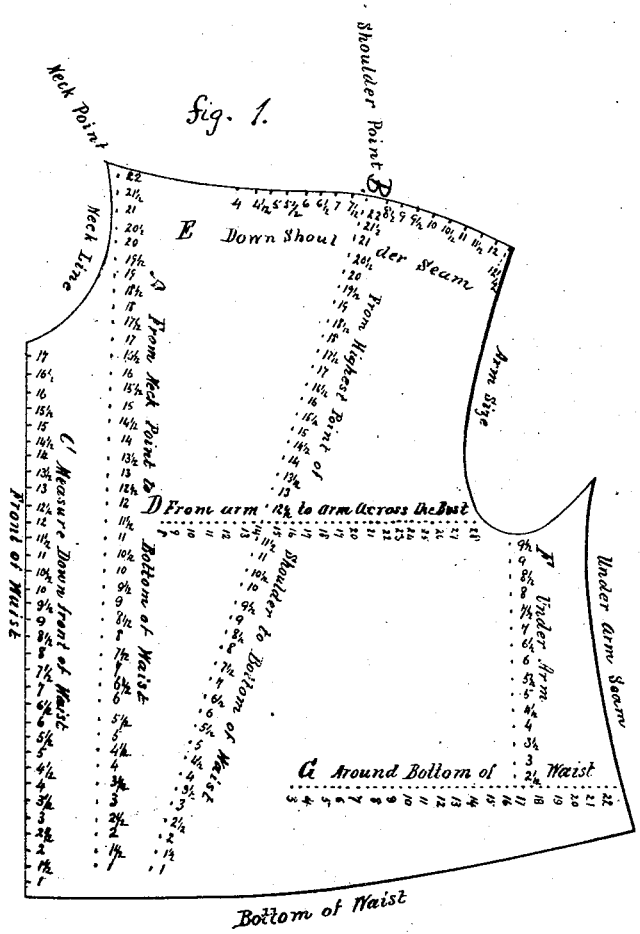
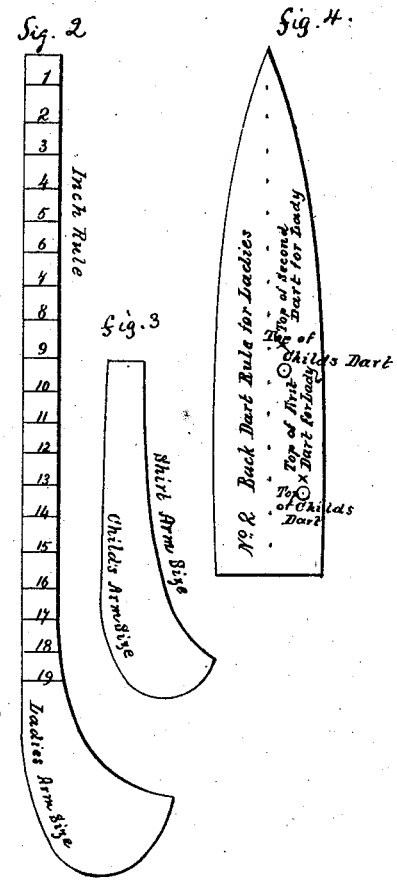
Witnesses.  Inventor.
Charles Taylor  Mary F. Carpenter
F. Emery 2 Sheets--Sheet 2.
MARY F. CARPENTER.
Dress-Pattern Charts.
No. 155,287.  Patented Sept. 22, 1874.
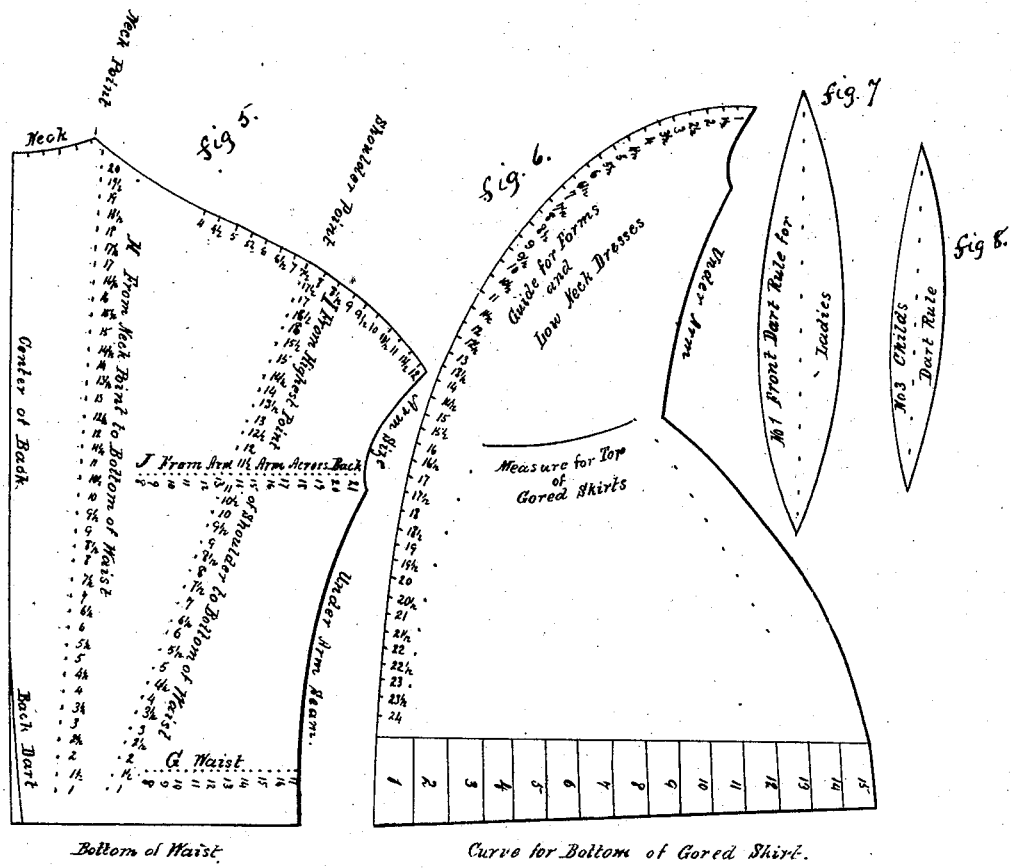

UNITED STATES PATENT OFFICE.

MARY F. CARPENTER, OF NORTHFIELD, MINNESOTA.

IMPROVEMENT IN DRESS-PATTERN CHARTS.

Specification forming part of Letters Patent No. 155,287, dated September 22, 1874; application filed August 16, 1873.

*To all whom it may concern:*

Be it known that I, MARY F. CARPENTER, of Northfield, in the county of Rice, in the State of Minnesota, have invented a new, useful, and original method of measuring for cutting and fitting all kinds of ladies' and children's outside dresses and garments, under whatever name they may be known or called, whether as skirt-waists, wrappers, polonaises, sacks, basques, or bodices, &c., which said invention and discovery I have denominated and desire to have known as "Mrs. Mary F. Carpenter's Dress-Guide;" and I do hereby declare that the following is a full and exact description thereof and the method of using the same for the purpose aforesaid, reference being had to the accompanying drawings, and to the letters of reference marked thereon.

My invention consists in pattern charts or cards provided with graduated and lettered scales and perforations from which to draft patterns for garments.

In the drawing, Figure 1 represents the pattern-chart for the waist-front. Fig. 2 represents an inch-rule and an arm-size measure combined; Fig. 3, a different arm-size measure; Fig. 4, the back-dart rule; Fig. 5, the back-waist pattern-chart; Fig. 6, a gored-skirt pattern-chart; Figs. 7 and 8, front-dart rules of different sizes.

The following is a detailed description of the manner of using my charts:

Directions for measuring.—A. Measure from neck-point to bottom of waist. B. Measure from highest point of shoulder to bottom of waist. C. Measure down front of waist. D. Measure from arm to arm across the bust. E. Measure down shoulder-seam. F. Measure down straight under the arm. G. Measure around bottom of the waist.

Back-measure.—H. Measure from neck-point to bottom of waist. I. Measure from highest point of shoulder to bottom of waist. J. Measure from arm to arm across the back.

Directions for cutting.—For example, your measure is, on line A, seventeen inches; on line B, seventeen inches; on line C, thirteen and a half inches; on line D, eighteen inches; on line E, seventeen inches; on line F, eight inches; on line G, sixteen inches; and the back-measure on line H is sixteen inches, on line I is fourteen inches, on line J fifteen inches, and on line G eight inches: first, dot at 17 on line A; then at 17 on line B; then at 18 on line D; then at 7 on line E; then at 16 on line G; then draw a line at bottom of guide; move down guide even with dot 17 on line A and 17 on line B; then draw a line down the shoulder to figure 7.

Length of shoulder seam.—Move the guide up so that dot 13½ on line C will come even with neck-line, and the side resting at dot. Then draw neck-line. Move the guide forward so that line F will come one and a half (1½) inch from dot on line D, the bottom of guide resting on line at bottom of waist. Then dot at 8 on line F. Then take arm-size, placing the bottom even with dot under arm, and resting on bust-dot, the top resting at length of shoulder-line. Then draw a line for arm-size. Then take guide and place the arm-point even with the line you have drawn—the bottom at dot for size around the waist. Then draw a line.

How to find the place for darts.—Place the wide end of dart (rule second) even with front of waist, the other end resting directly under arm-size. Then dot at first dot; then at second. Then take first dart-rule, place the point at first dot, lay the rule one and a half inch (1½) from bottom of waist, and mark around it. Then take second dart-rule, place the point at second dot, the bottom one-half (½) inch from bottom of first dart, and mark around it. This completes the front.

For cutting the back, place the back of the guide even with the folded edge of cloth. Then dot at 16 on line H, and 14 on line I, 15 on line J, and 8 on line G. Then draw a line at bottom of guide. Move the guide down so that neck-point will rest on dot of line H, shoulder resting on dot-line I. Then draw shoulder-line. Always allow the back on length of shoulder one-half (½) inch longer than the front, for fulling in. Then move the guide even with folded edge of the cloth and draw the neck-line. Then move the guide so the top of arm-size will come even with shoulder-line, the lower edge resting on a line even with dot across the back. Then draw a line for back arm-size. Then move bottom of guide so it will rest on dot at bottom of waist, and draw under arm-seam.

Then take form-guide; place the top even with arm-size, the bottom one (1) inch from back-dart. Then draw a line.

Rule for cutting skirt-waist.—Allow one-half (½) inch on length of shoulder-seam. Allow three (3) inches across the bust for fullness. The darts make fullness for bottom of front. Allow two (2) inches across the back and four (4) inches for bottom of back.

The patterns, as indicated in the drawings accompanying this specification, are made of good thick pasteboard or other suitable material, and in form and shape as indicated in said drawings, but enlarged four times, to correspond with the scale upon which they are drawn, and upon each should be written or printed all the directions, letters, numbers, dots, and figures placed thereon, as shown by said drawings, and having reference to the scale of one inch for each quarter of an inch in making said patterns for use, agreeably to the foregoing directions.

Having thus described my invention and the manner of using the same, I claim and desire to secure by Letters Patent—

The pattern-charts herein described and shown, from which to cut out ladies' and children's outside garments, and having graduated scales, applied substantially in the manner and for the purpose specified.

MARY F. CARPENTER.

Witnesses:
CHAS. TAYLOR,
F. EMERY.